(12) United States Patent
Kreikemeier

(10) Patent No.: US 7,300,003 B1
(45) Date of Patent: Nov. 27, 2007

(54) APPARATUS AND METHOD FOR APPLYING DRY INOCULANT TO FORAGE MATERIAL

(76) Inventor: Kelly Kreikemeier, 1493 Hwy 275, Lot 20, West Point, NE (US) 68788

( * ) Notice: Subject to any disclaimer, the term of this patent is extended or adjusted under 35 U.S.C. 154(b) by 338 days.

(21) Appl. No.: 11/006,454

(22) Filed: Dec. 7, 2004

(51) Int. Cl.
*A01C 3/06* (2006.01)
*A01C 15/04* (2006.01)

(52) U.S. Cl. ....................... 239/654; 239/655

(58) Field of Classification Search ........... 239/655, 239/654, 318, 142; 222/636, 272; 111/174, 111/177, 186, 136; 56/16.8
See application file for complete search history.

(56) References Cited

U.S. PATENT DOCUMENTS

| | | | |
|---|---|---|---|
| 3,439,683 A * | 4/1969 | Keller ................ 460/13 |
| 4,280,419 A * | 7/1981 | Fischer ............... 111/174 |
| 4,504,709 A | 3/1985 | Gandrud | |
| 4,522,340 A | 6/1985 | Gandrud | |
| 4,705,220 A | 11/1987 | Gandrud et al. | |
| 4,711,253 A * | 12/1987 | Anderson ............ 460/100 |
| 4,790,484 A * | 12/1988 | Wall ................... 239/655 |
| 4,793,742 A * | 12/1988 | Strand ................. 406/79 |
| 4,801,210 A | 1/1989 | Gian | |
| 5,018,587 A | 5/1991 | Gandrud et al. | |
| 5,028,009 A * | 7/1991 | Takata ................. 239/655 |
| 5,092,526 A * | 3/1992 | Takata ................. 239/655 |
| 5,178,333 A * | 1/1993 | Barber et al. ........ 239/655 |
| 5,718,507 A | 2/1998 | Gian | |
| 5,873,226 A * | 2/1999 | McLeod ............... 56/14.6 |
| 6,443,369 B1 | 9/2002 | Dohrmann et al. | |
| 6,837,447 B1 * | 1/2005 | Clark ................... 239/318 |

* cited by examiner

*Primary Examiner*—Árpád Fábián Kovács

(57) ABSTRACT

A dry inoculant dispenser includes a hopper with dry inoculant therein, and a conveyor for carrying dry product to a vertical drop tube. The drop tube is connected to a dispenser tube that will direct the inoculant to the forage material. A flow of air is created in the dispenser tube to carry inoculant therethrough, and a vacuum is created in the drop tube such that dry inoculant within the drop tube is sucked into the dispenser tube and dispensed from the distal end thereof.

7 Claims, 2 Drawing Sheets

APPARATUS AND METHOD FOR APPLYING DRY INOCULANT TO FORAGE MATERIAL

CROSS-REFERENCES TO RELATED APPLICATIONS (Not Applicable)

STATEMENT AS TO RIGHTS TO INVENTIONS MADE UNDER FEDERALLY SPONSORED RESEARCH AND DEVELOPMENT (Not Applicable)

INCORPORATION-BY-REFERENCE OF MATERIAL SUBMITTED ON A COMPACT DISC (Not applicable)

BACKGROUND OF THE INVENTION (1) Field of the Invention

The present invention relates generally to apparatus for mixing dry granular material uniformly with bulk materials, and more particularly to an improved apparatus for applying minute amounts of dry inoculant to large quantities of forage materials.

(2) Description of Related Art

Bacterial inoculant is applied to feedstuffs before ensiling, to improve the preservation efficiency of the ensiled crop. For forage crops, applying the inoculant at the cutter is the most efficacious method of application.

Inoculant can be applied in either a wet or dry condition. In a dry application, the bacteria are blended with a dry granular material and applied to the forage at the rate of ¼ pound to one pound per treated ton of forage. The most common method of application is the use of a granular applicator system such as that disclosed in U.S. Pat. No. 4,705,220. While this system clearly accomplishes its purpose of applying dry inoculant to a forage material, it has several drawbacks. First, the amounts of inoculant that must be applied require the user to handle hundreds or thousands of pounds of the materials each day. Such an amount is extremely labor intensive. However, attempts to use smaller amounts of inoculant in such a system produce variable inoculation rates, and therefore do not produce acceptable results.

Inoculants have also been applied in liquid form. Typically, dry bacterial concentrate is mixed with water and sprayed onto the forage. Application rates of one quart of liquid per ton of forage were common. As with dry applications, such large amounts of liquid products were very labor intensive.

Recently, a new applicator system that uses much less water (about 1.28 ounces per ton rather than a quart per ton) has been disclosed, in US Published Application 20030006312 to Dohrmann. While this new applicator is a vast improvement over prior art systems, there are still limitations.

First, some forage harvesters would prefer to not have to handle liquid inoculant in any manner. The difficulties and complexities of dealing with a liquid can be much greater than with a dry product.

Second, when dry bacteria are mixed with water, the inoculant must be used quickly, to maintain maximum viability. Thus, equipment breakdown, rain events, or even simply quitting for the evening, can all reduce the efficaciousness of the bacteria.

BRIEF SUMMARY OF THE INVENTION

It is therefore a general object of the present invention to provide an improved apparatus and method for applying small amounts of dry inoculant uniformly in forage material.

Another object is to provide a dry inoculant applicator and method that meters precise amounts of dry inoculant into an air stream, without "blow back" into the supply of inoculant.

These and other objects will be apparent to those skilled in the art.

The apparatus and method for applying dry inoculant to forage material includes a dry inoculant dispenser having a hopper with dry inoculant therein, and a conveyor for carrying dry product to a vertical drop tube. The drop tube is connected to a dispenser tube that will direct the inoculant to the forage material. A flow of air is created in the dispense tube to carry inoculant therethrough, and a vacuum is created in the drop tube such that dry inoculant within the drop tube is sucked into the dispenser tube and dispensed from the distal end thereof.

BRIEF DESCRIPTION OF THE SEVERAL VIEWS OF THE DRAWING

The preferred embodiment of the invention is illustrated in the accompanying drawings, in which similar or corresponding parts are identified with the same reference numeral throughout the several views, and in which.

DETAILED DESCRIPTION OF THE INVENTION

Figure 1:
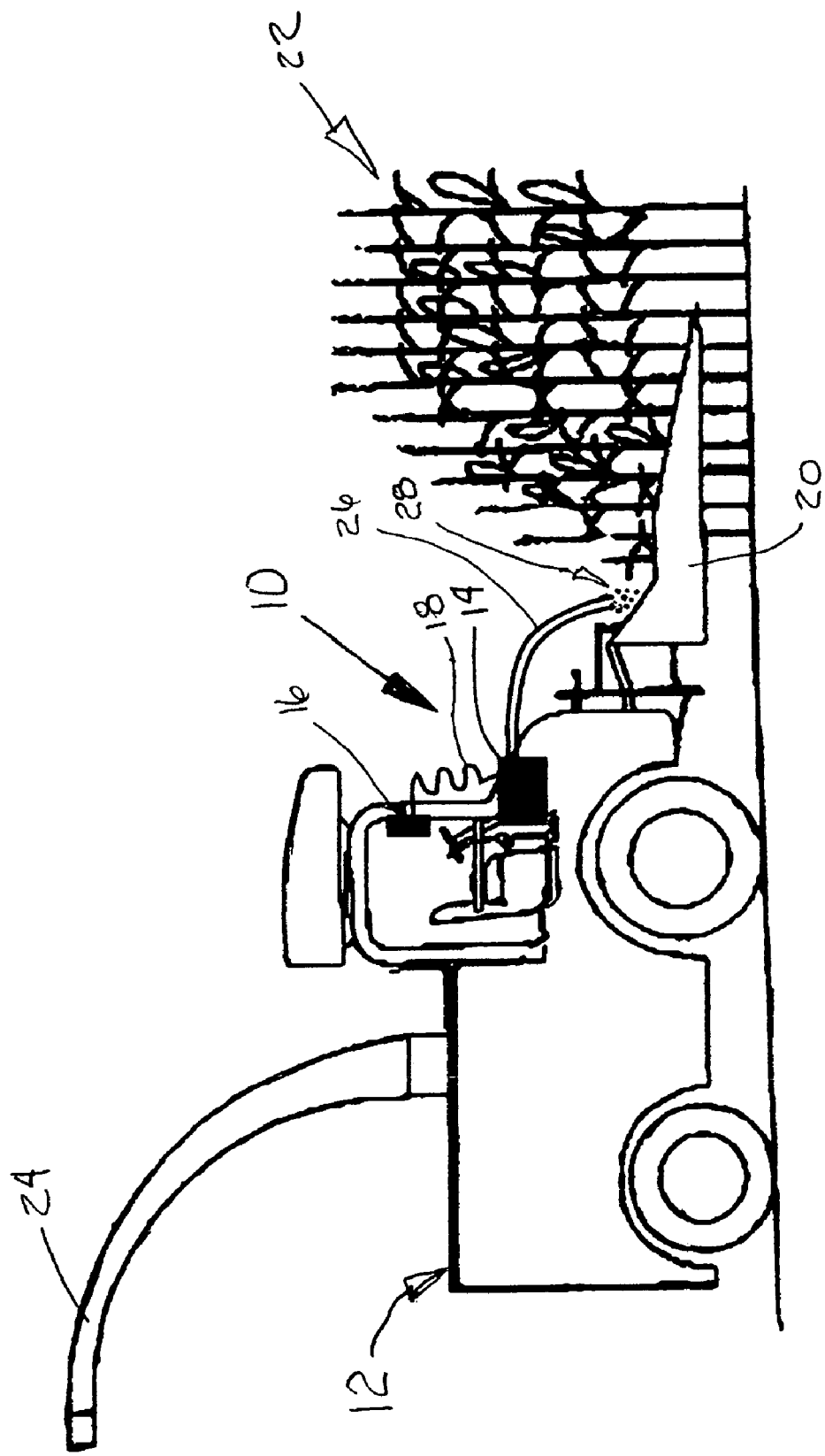
FIG. 1 is a pictorial view of a silage cutter with the applicator of the present invention installed.

Referring now to the drawings, and more particularly to FIG. 1, the dry inoculant application system of the present invention is designated generally at 10, and is shown installed on a self-propelled silage cutter 12. System 10 includes an applicator designated generally at 14, and an electrical control box 16 electrically connected to applicator 14 via wire 18.

Cutter 12 is merely an example of one type of harvesting equipment upon which the system 10 of the present invention may be installed. Cutter 12 includes a cutting head 20, which is shown cutting corn stalks 22 to create corn silage. Cutter 12 cuts and conditions the corn stalks 22, or other similar material, and dispenses the conditioned forage material out spout 24. A dispenser tube 26 extends from applicator 14 to dispense dry inoculant 28 to the cut forage material in cutter head 20. It should be noted that the location of applicator 14 and dispenser tube 26 in FIG. 1 is a matter of choice for the owner/operator of the equipment. The dry inoculant 28 may be dispensed onto the forage material at any desired location from cutting head 20 to spout 24.

Figure 2:
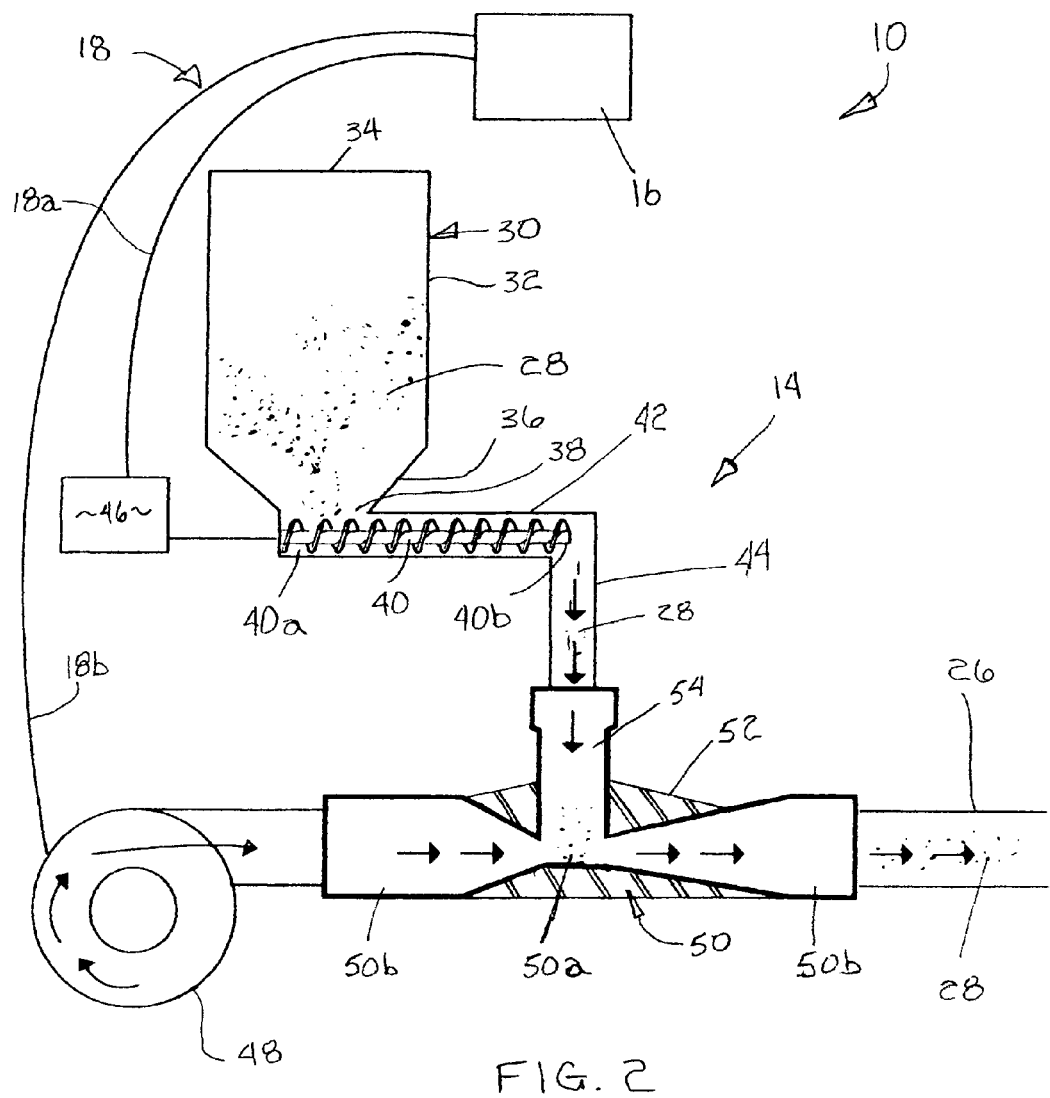
FIG. 2 is an enlarged schematic view of the applicator of the present invention with portions shown in vertical sectional view.

Referring now to FIG. 2, a schematic diagram of the dry application system 10 is shown. Applicator 14 includes a hopper 30, which consists of an upright enclosed container 32 having a removable lid 34. Hopper 30 holds the dry material 28 desired to be applied. As noted above, this dry material may be sugar plus dried bacterial culture. However, this applicator may also be used in other applications, wherein the dry material 28 may be a feed additive, a trace mineral, or any other similar dry products in dry powder or fine granular form that might be added to a total mixed ration for cattle, pigs, chickens or other livestock. In addition, the applicator system 10 of the present invention may be used in completely different fields of use, wherein a dry product is applied to a large quantity of material at a very low inclusion rate.

The lower end of hopper 30 includes inclined walls to form a funnel portion directing the dry materials 28 within the hopper to a lower outlet 38. Outlet 38 communicates directly with an upstream end 40a of an auger 40 within a pipe 42. The downstream or terminal end 40b of auger 40 communicates with the upper end of a vertical drop tube 44. As shown in FIG. 2, the terminal end 40b of auger 40 extends beyond the wall of the drop tube 44 so that dry materials 28 do not accumulate at the end of pipe 42.

A variable speed gear motor 46 is connected to auger 40 to selectively drive the auger 40 at a desired speed, to thereby dispense dry material 28 at a desired metered rate. While auger 40 is the preferred apparatus for moving the dry material 28 from hopper 30 to drop tube 28, other apparatus could be used to perform this function equally as well. A conveyor is one example of such an apparatus.

Motor 46 is electrically connected to control box 16 via wire 18a. Control box 16 is typically mounted within the cab of the harvester 12 (as shown in FIG. 1) to permit quick and easy access by the user. Control box 16 is designed to allow the user to control the speed of motor 46, so that the dry material 28 is metered out and applied at a desired rate of inclusion. The power source for application system 10 and control box 16 may be the vehicle to which it is attached (harvester 12), or from a standard electrical power source such as a battery or generator. A second wire 18b from control box 16 extends to a blower 48, described in more detail below.

One of the important aspects of the invention is to provide a vacuum within drop tube 44, so that air or other gas is not forced up the drop tube toward the hopper, and hampering or obstructing the metered flow of the inoculant or dry material 28. In the preferred embodiment, the vacuum is produced by a venturi 50 formed within an injector housing 52. Venturi 50 is formed by a tube with a short constricted section 50a and opposing widened tapered ends 50b, such that air flowing through the constricted portion 50a at a higher velocity than through the tapered ends 50b creates a pressure differential in the constricted section 50a. The lower end of drop tube 44 is connected to the constricted section 50a via an inlet port 54 in injector 52, such that the pressure differential creates a vacuum within drop tube 44.

An alternative to the venturi configuration of the preferred embodiment would be to position a blower in line with the drop tube 44 and dispensing tube 26, where a vacuum exists on an upstream side of the blower and positive pressure is formed on the downstream side. Alternatively, some vehicles have a vacuum built into the machinery, such as the "blower" of a harvester, which could produce an adequate vacuum to dispense the dry material 28. In such a case, one could simply attach a tube from the vacuum side of the blower to the dispensing tube 26, to cause the dry material 28 to become entrained in the airflow and dispensed out dispenser tube 26. Also, the injector housing 52 may not be required.

As noted above, the preferred embodiment of the invention uses a blower 48 to create the airflow through venturi 50. Preferably, blower 48 is a centrifugal blower. However, an air compressor, or other source of pressurized gas could be used in place of blower 48, depending upon the application to which system 10 is applied. All of these alternatives are envisioned with in the scope of the invention.

Dispenser tube 26 is preferably an elongated, flexible tube for carrying and directing the inoculant 28 to the forage material. In such an application, tube 26 would be about 1 inch in diameter and 10 to 15 feet in length.

Because of the vacuum applied to drop tube 44, very small amounts of dry material, such as inoculant, may be uniformly dispensed from dispenser tube 26. This permits the user to greatly reduce the effective inclusion rate over systems without this feature. In fact, the applicant has found that the system 10 can provide a uniform inclusion rate of about 2 grams of inoculant per ton of forage material, as compared with inclusion rates of about 113-454 grams per ton in prior art dry application systems.

Whereas the invention has been shown and described in connection with the preferred embodiments thereof, many modifications, substitutions and additions may be made which are within the intended broad scope of the appended claims.

What is claimed is:

1. A dry product dispenser, comprising:
   an enclosed hopper for retaining a dry product to be dispensed;
   a selectively operable feeder assembly having an upstream end communicating with the hopper and a downstream end extending therefrom, for carrying dry product from said hopper;
   a vertical drop tube having an upper end in communication with the downstream end of the feeder assembly, and a lower open end;
   said feeder assembly including an auger operably disposed within an elongated pipe to convey dry product from the hopper to the drop tube;
   said feeder assembly being electrically connected to a control box with controls for activating the feeder assembly to operate and adjust the speed of the feeder assembly;
   a dispenser tube connected to the lower end of the drop tube and extending therefrom to a distal end, for directing dry product dispensed therethrough; and
   means for creating an air flow through the dispenser tube from the drop tube to the distal end and for creating a vacuum within the drop tube, whereby dry product within the drop tube is sucked into the dispenser tube and dispensed from the distal end thereof;
   said means for creating an air flow and for creating a vacuum includes:
      a venturi interposed between the drop tube and dispenser tube, the venturi including:
         a central bore with upstream and downstream ends;
         a short constricted diameter portion generally centered between the ends;
         the bore ends tapering from the constricted portion to a larger diameter at the ends; and
         an inlet port oriented perpendicular to the bore and communicating with the constricted portion;
      the lower end of the drop tube connected to and communicating with the venturi inlet port;
      the downstream end of the venturi connected to and communicating with the dispenser tube; and
      a source of air under pressure connected to the upstream end of the venturi, to supply air flow through the venturi.

2. The dispenser of claim 1, wherein said source of air pressure includes a centrifugal blower with an output connected to the venturi upstream end.

3. The dispenser of claim 2, wherein said blower is electrically connected to a control box with controls for activating the blower to operate and adjust the speed of the blower.

4. A dry product dispenser, comprising:

an enclosed hopper for retaining a dry product to be dispensed;

a selectively operable feeder assembly having an upstream end communicating with the hopper and a downstream end extending therefrom, for carrying dry product from said hopper;

a vertical drop tube having an upper end in communication with the downstream end of the feeder assembly, and a lower open end;

a dispenser tube connected to the lower end of the drop tube and extending therefrom to a distal end, for directing dry product dispensed therethrough; and means for creating an air flow through the dispenser tube from the drop tube to the distal end and for creating a vacuum within the drop tube, whereby dry product within the drop tube is sucked into the dispenser tube and dispensed from the distal end thereof;

said means for creating an air flow and for creating a vacuum including:

a venturi interposed between the drop tube and dispenser tube, the venturi including:

a central bore with upstream and downstream ends;

a short constricted diameter portion generally centered between the ends;

the bore ends tapering from the constricted portion to a larger diameter at the ends; and an inlet port oriented perpendicular to the bore and communicating with the constricted portion;

the lower end of the drop tube connected to and communicating with the venturi inlet port;

the downstream end of the venturi connected to and communicating with the dispenser tube; and a source of air under pressure connected to the upstream end of the venturi, to supply air flow through the venturi.

5. The dispenser of claim 4, wherein said source of air pressure includes a centrifugal blower with an output connected to the venturi upstream end.

6. The dispenser of claim 5, wherein said blower is electrically connected to a control box with controls for activating the blower to operate and adjust the speed of the blower.

7. In combination:

a harvester, including:

a cutting head for cutting a crop to create conditioned forage material;

a cab for an operator to operate the harvester; and a spout for dispensing conditioned forage material from the harvester; and a dry inoculant dispensing system mounted on the harvester, for dispensing dry inoculant at a very low inclusion rate uniformly over the forage material, comprising:

an enclosed hopper for retaining dry inoculant to be dispensed;

a selectively operable feeder assembly having an upstream end communicating with the hopper and a downstream end extending therefrom, for carrying dry inoculant from said hopper;

a vertical drop tube having an upper end in communication with the downstream end of the feeder assembly, and a lower open end;

a dispenser tube having a first end connected to the lower end of the drop tube and a distal end extending therefrom to a location positioned over and directed at the forage material, for directing dry inoculant dispensed therethrough; and means for creating an air flow through the dispenser tube from the first end to the distal end and for creating a vacuum within the drop tube, whereby dry product within the drop tube is sucked into the dispenser tube and dispensed from the distal end thereof;

said means for creating an air flow and for creating a vacuum including:

a venturi interposed between the drop tube and dispenser tube, the venturi including:

a central bore with upstream and downstream ends;

a short constricted diameter portion generally centered between the ends;

the bore ends tapering from the constricted portion to a larger diameter at the ends; and an inlet port oriented perpendicular to the bore and communicating with the constricted portion;

the lower end of the drop tube connected to and communicating with the venturi inlet port;

the downstream end of the venturi connected to and communicating with the dispenser tube; and a source of air under pressure connected to the upstream end of the venturi, to supply air flow through the venturi.

* * * * *